Figure 1:
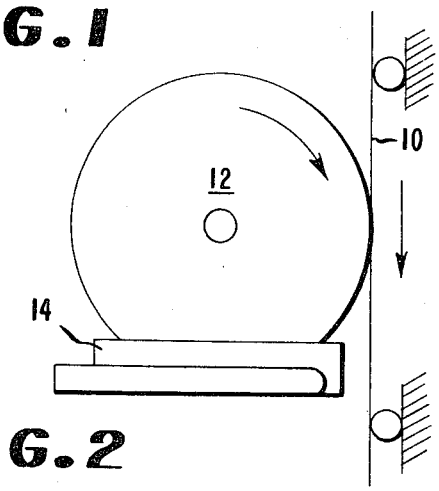
Figure 2:
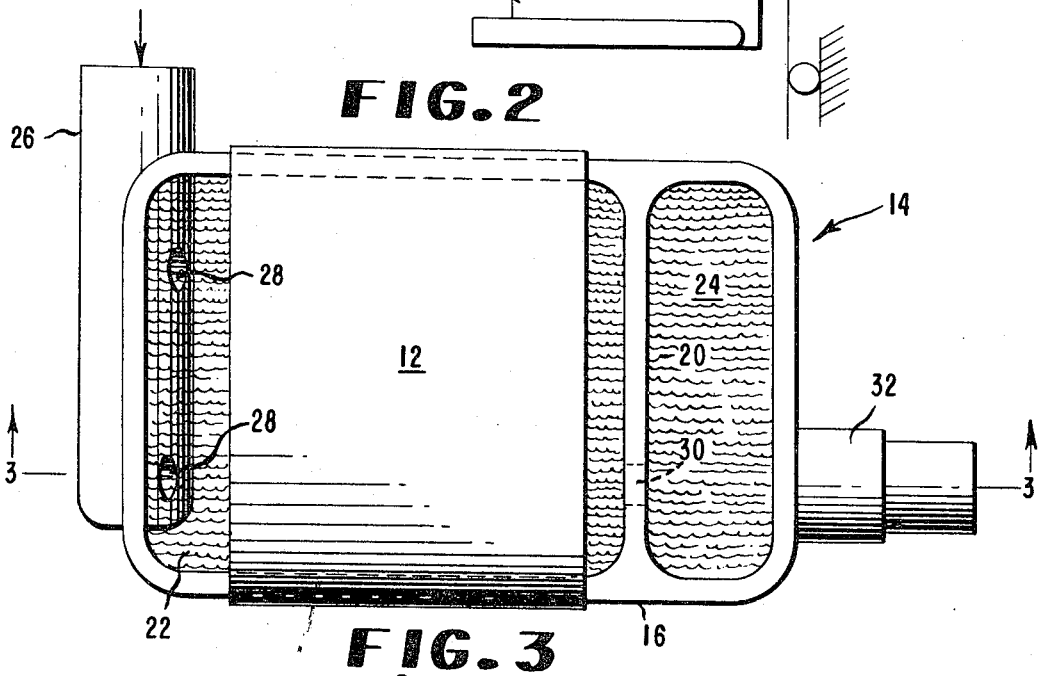
Figure 3:
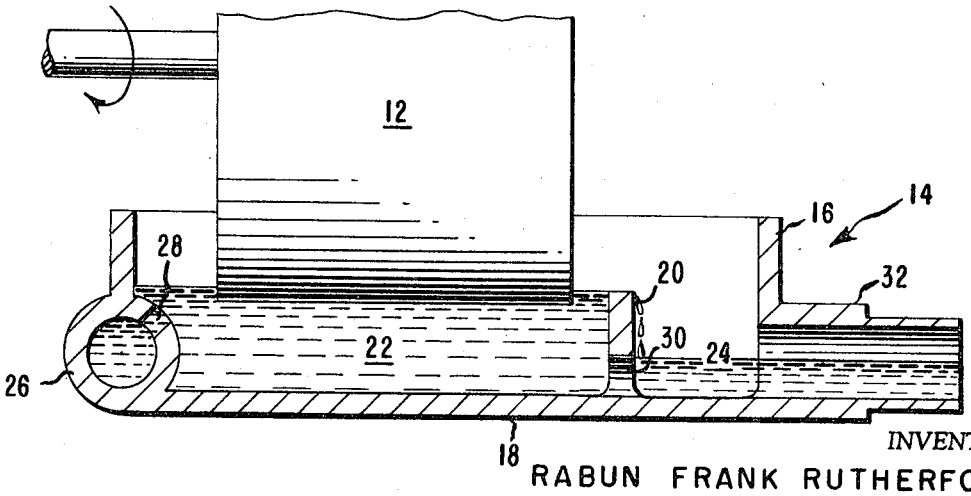

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 26, 1970

874 O.G. 1021

T874,011

APPARATUS FOR MAINTAINING A LIQUID LEVEL AND PREVENTING STRATIFICATION

Rabun Frank Rutherford, Richmond, Va., assignor to E. I. du Pont de Nemours and Company, Wilmington, Del., a corporation of Delaware

Filed June 5, 1969, Ser. No. 830,765

**Int. Cl. B05c *3/02***

U.S. Cl. 137—576

1 Sheet Drawing. 4 Pages Specification

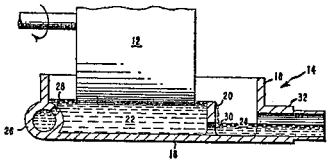

A finish pan for a yarn finish applicator that includes an overflow weir for dividing the pan into separate reservoir and overflow cavities and maintaining a predetermined liquid level in the reservoir. Means are provided for supplying liquid finish to said reservoir cavity and draining said overflow cavity. A passage interconnecting the reservoir and overflow cavity is provided in the weir near the base of the pan to allow not only flow over the top of the weir but also flow through the base of the weir to break up stratification which tends to form in the liquid contained in the reservoir cavity.

May 26, 1970 R. F. RUTHERFORD T874,011

APPARATUS FOR MAINTAINING A LIQUID LEVEL AND PREVENTING STRATIFICATION

Filed June 5, 1969

INVENTOR

RABUN FRANK RUTHERFORD

BY Howard P. West Jr.

ATTORNEY